US011880552B2

(12) United States Patent
Saito

(10) Patent No.: US 11,880,552 B2
(45) Date of Patent: Jan. 23, 2024

(54) INFORMATION PROCESSING DEVICE AND INFORMATION PROCESSING METHOD

(71) Applicant: SONY GROUP CORPORATION, Tokyo (JP)

(72) Inventor: Mari Saito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/615,212

(22) PCT Filed: Mar. 23, 2020

(86) PCT No.: PCT/JP2020/012583
§ 371 (c)(1),
(2) Date: Nov. 30, 2021

(87) PCT Pub. No.: WO2020/250538
PCT Pub. Date: Dec. 17, 2020

(65) Prior Publication Data
US 2022/0229526 A1    Jul. 21, 2022

(30) Foreign Application Priority Data
Jun. 10, 2019    (JP) .................................. 2019-108131

(51) Int. Cl.
*G06F 3/0484*    (2022.01)
*G06F 3/0482*    (2013.01)
(Continued)

(52) U.S. Cl.
CPC .......... *G06F 3/0484* (2013.01); *G06F 3/0482* (2013.01); *G06F 3/0488* (2013.01); *G06F 3/167* (2013.01); *G06F 8/65* (2013.01)

(58) Field of Classification Search
CPC .... G06F 3/0484; G06F 3/0482; G06F 3/0488; G06F 3/167
See application file for complete search history.

(56) References Cited

U.S. PATENT DOCUMENTS 5,835,911 A * 11/1998 Nakagawa ................ G06F 8/65
707/999.203
10,620,937 B1 * 4/2020 Bross ........................ G06F 8/38
(Continued)

FOREIGN PATENT DOCUMENTS

| JP | 2006-031189 A | | 2/2006 |
|---|---|---|---|
| JP | 2006031189 A | * | 2/2006 |
| JP | 2017-062647 A | | 3/2017 |

OTHER PUBLICATIONS

International Search Report and Written Opinion of PCT Application No. PCT/JP2020/012583, dated Jun. 9, 2020, 06 pages of English Translation and 07 pages of ISRWO.

*Primary Examiner* — William L Bashore
*Assistant Examiner* — Gregory A Distefano
(74) *Attorney, Agent, or Firm* — CHIP LAW GROUP

(57) ABSTRACT

An information processing device includes a processing control unit that executes predetermined control in accordance with processing that would have been executed by a second application in response to a user operation on a first application in a case where processing to be executed by the first application in response to the user operation is not identified, the second application having a correspondence relationship with the first application.

15 Claims, 8 Drawing Sheets

(51) Int. Cl.
*G06F 3/0488* (2022.01)
*G06F 3/16* (2006.01)
*G06F 8/65* (2018.01)

(56) References Cited

U.S. PATENT DOCUMENTS

| | | | | |
|---|---|---|---|---|
| 2008/0301661 | A1* | 12/2008 | Haynes | G06F 8/65 |
| | | | | 717/170 |
| 2009/0037492 | A1* | 2/2009 | Baitalmal | H04L 67/34 |
| 2009/0217309 | A1* | 8/2009 | Grechanik | G06F 11/3692 |
| | | | | 719/328 |
| 2009/0293004 | A1* | 11/2009 | Emam | G06F 3/0481 |
| | | | | 715/762 |
| 2013/0339872 | A1* | 12/2013 | Shuster | G06Q 30/00 |
| | | | | 715/746 |
| 2016/0019049 | A1* | 1/2016 | Kakhandiki | G06F 8/658 |
| | | | | 717/168 |
| 2017/0192873 | A1* | 7/2017 | Ozdemir | G06F 8/658 |
| 2019/0340114 | A1* | 11/2019 | Podoler | G06F 16/958 |

* cited by examiner

| VERSION NUMBER | PROCESSING | OPERATION |
|---|---|---|
| 1.0 | File open | Tap, Area(X1-X2,Y1-Y2) |
| 1.0 | File Print | Tap, Area(X3-X4,Y3-Y4) |
| 1.0 | Setting | Tap, Area(X5-X6,Y5-Y6) |
| ⋮ | ⋮ | ⋮ |
| 2.0 | File open | Tap, Area(X1-X2,Y1-Y2) |
| 2.0 | File Print | Tap, Area(X3-X4,Y3-Y4) |
| ⋮ | ⋮ | ⋮ |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/012583 filed on Mar. 23, 2020, which claims priority benefit of Japanese Patent Application No. JP 2019-108131 filed in the Japan Patent Office on Jun. 10, 2019. Each of the above-referenced applications is hereby incorporated herein by reference in its entirety.

FIELD

The present disclosure relates to an information processing device, an information processing method, and a program.

BACKGROUND

In an information device such as a personal computer (PC), a tablet terminal, and a smartphone, various functions are implemented by an application program (referred to as an "application" in the present disclosure) running on a computer system. When a user using an information device repeatedly uses an application, the proficiency level of the operation on the application is improved. However, in a case where the operation method of the application is changed due to, for example, updating of the application or the like, a desired result cannot be obtained by an operation used before the change, and the user is confused in operation.

In view of such a situation, a technique has been proposed in which, when an application is updated, a support screen for explaining a change in the operation method before and after the updating is presented to a user (see, for example, Patent Literature 1).

CITATION LIST

Patent Literature

Patent Literature 1: Japanese Patent Application Laid-open No. 2017-62647

SUMMARY

Technical Problem

However, in the related art, the user needs to remember a new operation method by looking at the support screen when the application is updated, which is a large burden on the user.

Therefore, the present disclosure proposes an information processing device, an information processing method, and a program capable of improving convenience of a user.

Solution to Problem

In order to solve the problem, an information processing device according to an embodiment of the present disclosure comprises: a processing control unit configured to execute predetermined control in accordance with processing that would have been executed by a second application in response to a user operation on a first application in a case where processing to be executed by the first application in response to the user operation is not identified, the second application having a correspondence relationship with the first application.

DESCRIPTION OF EMBODIMENT

Figures 1, 2:
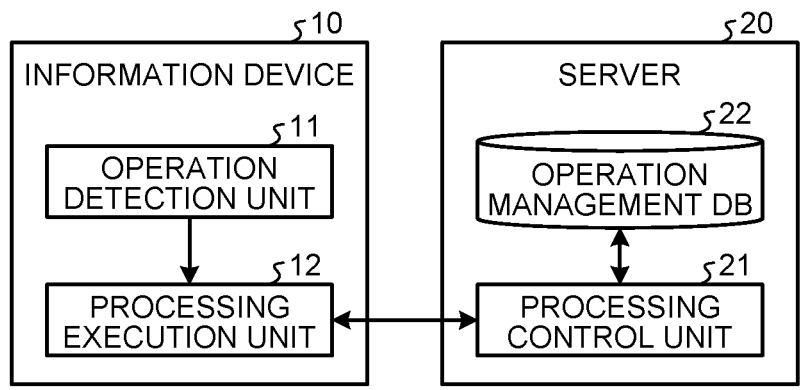
FIG. 1 is a block diagram illustrating a functional configuration example of an information processing system according to an embodiment.
FIG. 2 is a diagram illustrating an example of table data held by an operation management DB.

Hereinafter, an embodiment of the present disclosure will be described in detail with reference to the accompanying drawings. Note that the description will be made in the following order of items.

1. Outline of Embodiment
2. Information Processing System according to Embodiment
3. First Modification
4. Second Modification
5. Third Modification
6. Fourth Modification
7. Other Modifications
8. Hardware Configuration Example
9. Supplement

1. Outline of Embodiment

An operation method of an application that is software for implementing various functions in an information device may be changed by updating. In this case, an operation that is familiar in the application before the updating is not accepted by the application after the updating, and the user often feels inconvenient.

Such a problem may occur not only in a case of updating of the application, but may occur, for example, in a case where the application used so far is switched to another application belonging to the same category (for example, in a case where housekeeping account-book software, a scheduler, or the like is switched to another application) or in a case where an information device on which the application is operated is different (for example, in a case where an application that is often operated on a PC is operated on a smartphone, or the like). That is, a user often feels inconvenient when an operation that is familiar in a certain application cannot be accepted by an application to be used at the present time.

In order to solve such a problem, an embodiment of the present disclosure proposes a technical idea that enables a user to obtain a desired result by performing an operation in an application that the user intends to use at the present time (this is referred to as a "first application") when the operation is familiar in another application (this is referred to as a "second application") having a correspondence relationship with the application.

That is, in the embodiment of the present disclosure, a user operation on the first application is detected, and in a case where processing to be executed by the first application in response to the detected user operation is not identified, predetermined control in accordance with processing that would have been executed by the second application in response to the user operation is executed.

Here, the predetermined control in accordance with the processing that would have been executed by the second application is, for example, causing the first application to execute the processing that would have been executed by the second application, guiding an operation method for causing the first application to execute the processing that would have been executed by the second application, or a combination thereof.

In addition, in the embodiment of the present disclosure, even in a case where processing to be executed by the first application in response to the user operation is identified, in a case where the processing to be executed by the first application in response to the user operation and the processing that would have been executed by the second application in response to the user operation are different and execution of the processing to be executed by the first application is canceled (Undo), predetermined control in accordance with the processing that would have been executed by the second application is executed. In addition, in a case where the processing to be executed by the first application in response to the detected user operation is identified and the processing to be executed by the first application in response to the user operation and the processing that would have been executed by the second application in response to the user operation are different, a warning may be output regardless of whether the execution of the processing to be executed by the first application is canceled (Undo).

Note that, in the present disclosure, the "application" refers to general software for implementing various functions in an information device such as a PC, a tablet terminal, or a smartphone, and includes not only a native application that directly runs on an operating system (OS) of the information device but also a web application that runs on a web browser.

Hereinafter, the information processing system according to the embodiment of the present disclosure will be described in more detail while appropriately presenting specific cases where the first application is an application after the updating, the second application is an application before the updating, and the user operation is an operation using a touch screen.

2. Information Processing System According to Embodiment

FIG. 1 is a block diagram illustrating a functional configuration example of an information processing system according to an embodiment. For example, as illustrated in FIG. 1, the information processing system includes an information device 10 that is in a local environment and that is used by a user and a server 20 (information processing device) that is in a cloud environment, and can be configured as a network type information processing system in which these components communicate with each other through a network.

The information device 10 is a device including a computer system serving as an execution environment of software, various input/output devices, and the like, and implements various functions using an application. The information device 10 includes an operation detection unit 11 and a processing execution unit 12 as functional units related to use of an application.

The operation detection unit 11 detects a user operation on the application. The processing execution unit 12 executes processing of the application in response to the user operation detected by the operation detection unit 11. In the present embodiment, it is assumed that the application used by the information device 10 has been updated, and a part of the operation method has been changed from that before the updating by this updating.

The server 20 is a server computer that provides a service specific to the information processing system according to the embodiment. The server 20 includes processing control unit 21 and an operation management DB 22 as functional units for realizing a service in cooperation with the information device 10.

The processing control unit 21 controls processing of an application executed by the processing execution unit 12 of the information device 10. The operation management DB 22 is a database referred to by the processing control unit 21, and holds, for example, table data indicating a correspondence relationship between operation content on an application and processing, change information indicating change content of the application by updating, and the like.

An example of table data held by the operation management DB 22 is illustrated in FIG. 2. In the table data illustrated in FIG. 2, the correspondence relationship between operation contents and types of processing for the application is recorded together with the version numbers of the application. By referring to the table data, it can be seen what kind of processing the application should execute in response to a certain user operation for each version of the application. For example, in an application of a version number "1.0", an operation of tapping an area indicated by "(X5-X6, Y5-Y6)" on the touch screen is associated with "Setting" ("Setting" processing), and it can be seen that the processing to be executed by the application of the version number "1.0" in response to such a user operation is "Setting" processing.

Although the table data illustrated in FIG. 2 indicates an example in which the correspondence relationship between the operation contents and the types of processing is recorded for each version of one application, a correspondence relationship between operation contents and types of processing may be recorded for each version of each of a plurality of applications used by the information device 10. In this case, each application may be distinguished by an identification information (ID).

Figure 3:
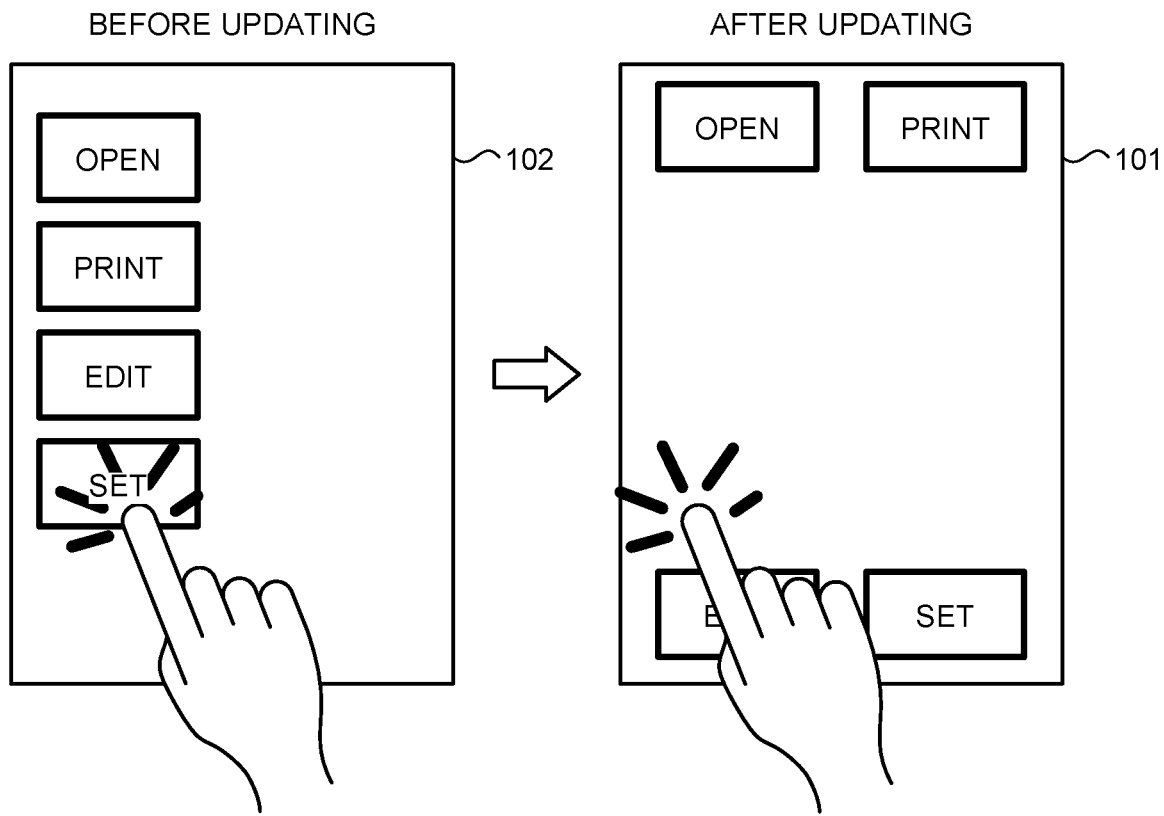
FIG. 3 is a diagram illustrating a specific example of control by a processing control unit.

Here, a specific example of control by the processing control unit 21 of the server 20 will be described with reference to examples. First, a case will be considered in which the layout of a graphical user interface (GUI) that displays a menu screen of an application is changed as illustrated in FIG. 3 due to updating of the application used by the information device 10.

Here, it is assumed that a user taps, on a GUI 101 of the application after the updating displayed on the touch screen of the information device 10, a position in an area where a "SET" button has been arranged on a GUI 102 of the application before the updating of the application in order to execute "Setting". This user operation is detected by the operation detection unit 11 of the information device 10 and transmitted to the processing execution unit 12. However, in the example of FIG. 3, no button is arranged at the position tapped by the user on the GUI 101 of the application after the updating. Therefore, processing to be executed by the application after the updating in response to the user operation is not identified.

In this case, the processing execution unit 12 notifies the processing control unit 21 of operation information (in this example, position information indicating a tap position on the touch screen) indicating the user operation detected by the operation detection unit 11. When the processing control unit 21 is notified of the operation information from the processing execution unit 12, the processing control unit 21 refers to the table data of the operation management DB 22 and checks processing that would have been executed by the application before the updating in response to the user operation detected by the operation detection unit 11. In the present example, the position tapped by the user on the GUI 101 of the application after the updating is the position in the area where the "SET" button was arranged in the GUI 102 of the application before the updating. Thus, it can be seen that the processing that would have been executed by the application before the updating in response to the user operation is the "Setting" processing. Therefore, the processing control unit 21 causes the processing execution unit 12 to execute the "Setting" processing.

Figure 4:
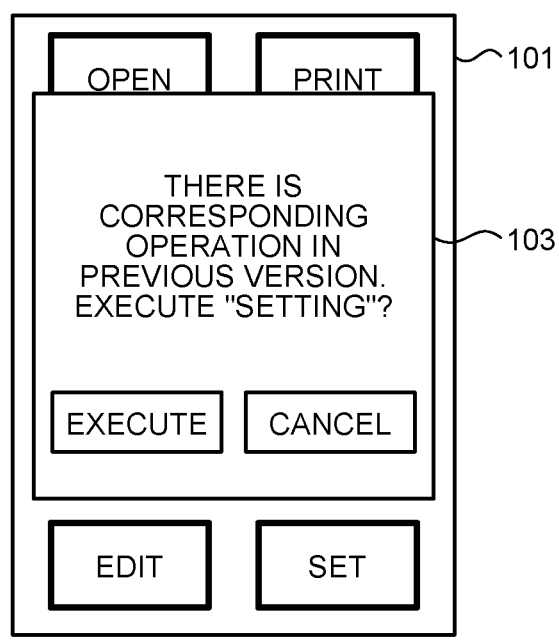
FIG. 4 is a diagram illustrating a specific example of control by the processing control unit.

For example, as illustrated in FIG. 4, the processing control unit 21 displays a dialog 103 on the GUI 101 of the application after the updating to inquire of the user whether the "Setting" processing needs to be executed. Here, for example, in a case where execution is instructed by the user, for example, by tapping an "EXECUTE" button in the dialog 103, the processing control unit 21 causes the processing execution unit 12 to execute the "Setting" processing. Note that the processing control unit 21 may cause the processing execution unit 12 to execute the "Setting" processing without inquiring of the user using the dialog 103 as illustrated in FIG. 4.

Figure 5:
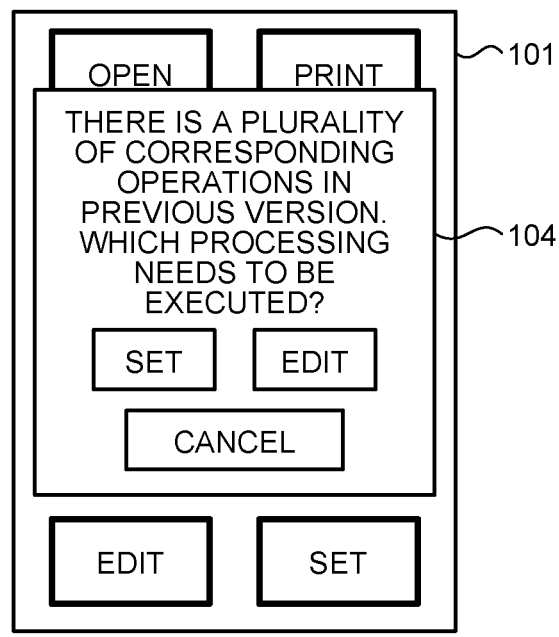
FIG. 5 is a diagram illustrating a specific example of control by the processing control unit.

Note that, in a case where the position tapped by the user on the GUI 101 of the application after the updating is across, for example, an area where the "SET" button has been arranged and an area where an "EDIT" button has been arranged in the GUI 102 of the application before the updating, the processing that would have been executed by the application before the updating in response to the user operation detected by the operation detection unit 11 is not uniquely identified, and there is a plurality of candidates. In such a case, for example, the processing control unit 21 may display, as illustrated in FIG. 5, a dialog 104 on the GUI 101 of the application after the updating to present the plurality of candidates to the user, and cause the processing execution unit 12 to execute processing corresponding to a candidate selected by the user from among the plurality of candidates.

Figure 6:
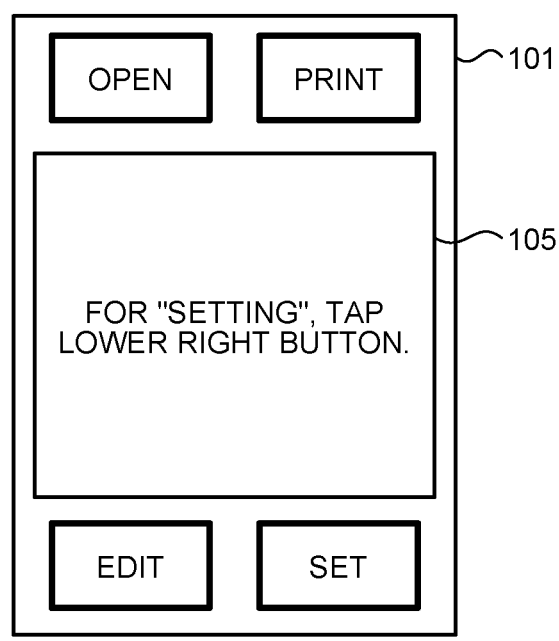
FIG. 6 is a diagram illustrating a specific example of control by the processing control unit.

In addition, instead of causing the processing execution unit 12 to execute the "Setting" processing, the processing control unit 21 may guide an operation method for instructing the "Setting" processing on the GUI 101 of the application after the updating. For example, the processing control unit 21 identifies an area where the "SET" button is arranged on the GUI 101 of the application after the updating by referring to the table data of the operation management DB 22. Then, for example, as illustrated in FIG. 6, the processing control unit 21 guides an operation method for instructing "Setting" by displaying a dialog 105 on the GUI 101 of the application after the updating. Furthermore, the processing control unit 21 may guide an operation method for instructing "Setting" by displaying, in the dialog 103 illustrated in FIG. 3, a message that is in the dialog 105 illustrated in FIG. 6.

Figure 7:
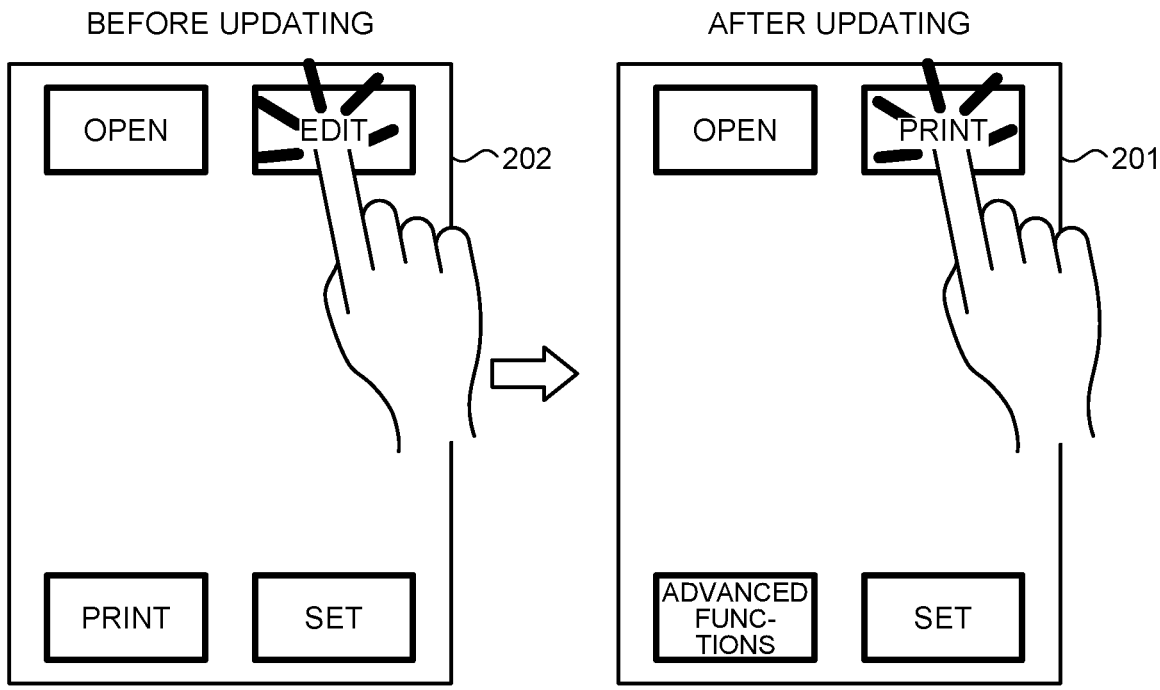
FIG. 7 is a diagram illustrating a specific example of control by the processing control unit.

Next, a case will be considered in which the layout of a GUI that displays a menu screen of an application is changed as illustrated in FIG. 7 due to updating of the application used by the information device 10. Here, it is assumed that a user taps, on a GUI 201 of the application after the updating, a position in an area where an "EDIT" button has been arranged on a GUI 202 of the application before the updating of the application in order to execute "Edit". This user operation is detected by the operation detection unit 11 of the information device 10 and transmitted to the processing execution unit 12. In the example of FIG. 6, "PRINT" button is arranged at a position tapped by the user on the GUI 101 of the application after the updating. Thus, the processing to be executed by the application after the updating in response to the user operation is identified as the "File Print" processing.

In this case, the processing execution unit 12 executes "File Print" processing in response to the user operation. However, a case where the user cancels the "Print" processing because the user intends to execute "Edit" processing is assumed. In this case, the processing execution unit 12 notifies the processing control unit 21 of operation information indicating the user operation detected by the operation detection unit 11. When the processing control unit 21 is notified of the operation information from the processing execution unit 12, the processing control unit 21 refers to the table data of the operation management DB 22 and checks processing that would have been executed by the application before the updating in response to the user operation detected by the operation detection unit 11. In the present example, the position tapped by the user on the GUI 201 of the application after the updating is the position in the area where the "EDIT" button was arranged in the GUI 202 of the application before the updating. Thus, it can be seen that the processing that would have been executed by the application before the updating in response to the user operation is the "Edit" processing. Therefore, the processing control unit 21 causes the processing execution unit 12 to execute the "Edit" processing.

Figure 8:
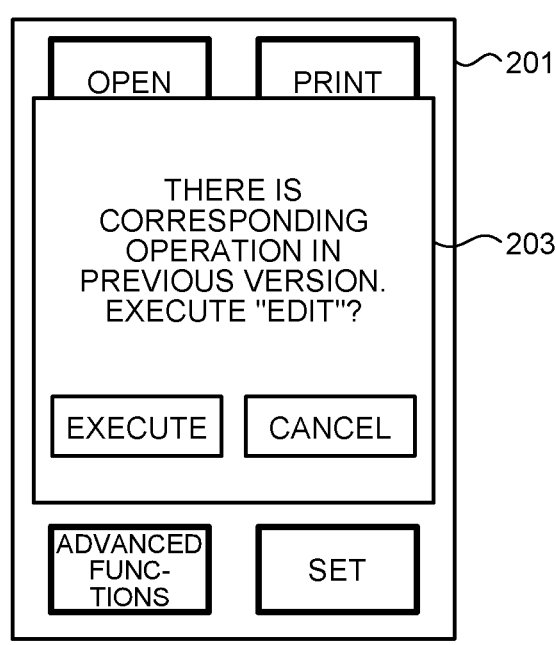
FIG. 8 is a diagram illustrating a specific example of control by the processing control unit.

For example, as illustrated in FIG. 8, the processing control unit 21 displays a dialog 203 on the GUI 201 of the application after the updating to inquire of the user whether the "Edit" processing needs to be executed. Here, for example, in a case where execution is instructed by the user, for example, by tapping an "EXECUTE" button in the dialog 203, the processing control unit 21 causes the processing execution unit 12 to execute the "Edit" processing. Note that the processing control unit 21 may cause the processing execution unit 12 to execute the "Edit" processing without inquiring of the user using the dialog 203 as illustrated in FIG. 8.

Figure 9:
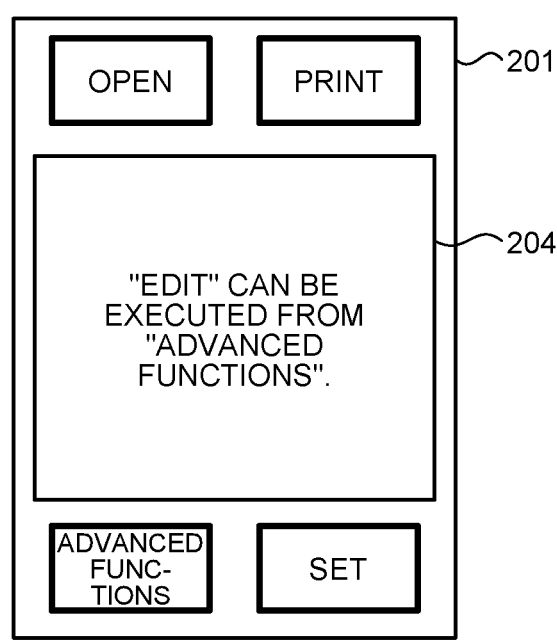
FIG. 9 is a diagram illustrating a specific example of control by the processing control unit.

In addition, instead of causing the processing execution unit 12 to execute the "Edit" processing, the processing control unit 21 may guide an operation method for instructing the "Edit" processing on the GUI 201 of the application after the updating. For example, the processing control unit 21 recognizes that "EDIT" is set as a part of "ADVANCED FUNCTIONS" in the application after the updating by referring to the change information held by the operation management DB 22. Then, for example, as illustrated in FIG. 9, the processing control unit 21 guides an operation method for instructing "Edit" processing by displaying a dialog 204 on the GUI 201 of the application after the updating. Furthermore, the processing control unit 21 may guide an operation method for instructing "Edit" processing by displaying, in the dialog 203 illustrated in FIG. 7, a message that is in the dialog 204 illustrated in FIG. 9.

Figure 10:
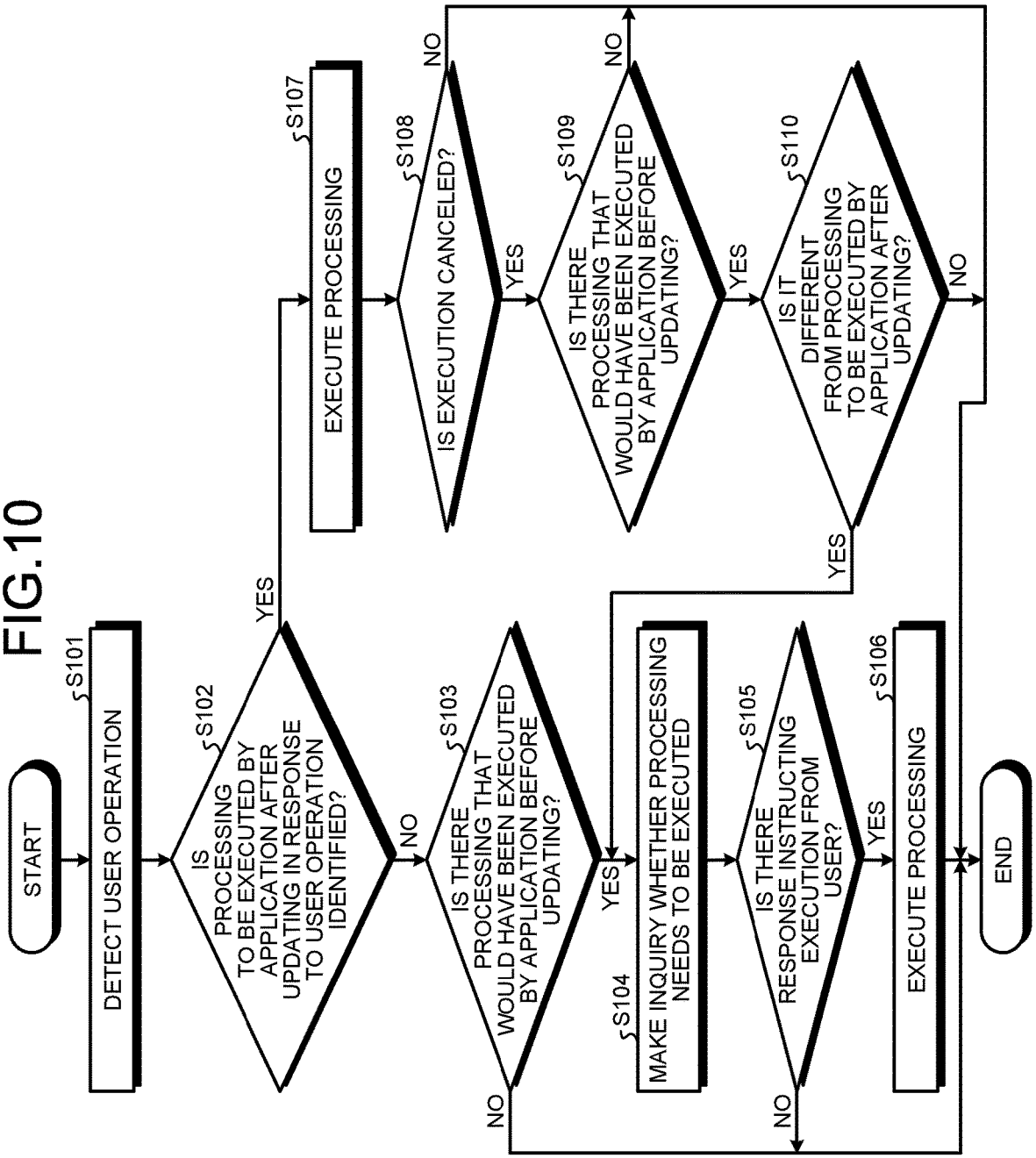
FIG. 10 is a flowchart illustrating an operation example of the information processing system according to the embodiment.

Next, an operation of the information processing system according to the embodiment will be described with reference to FIG. 10. FIG. 10 is a flowchart illustrating an operation example of the information processing system according to the embodiment.

When a user performs an operation on the application after the updating using an input device of the information device 10 in a state where the application after the updating is running on the computer system of the information device 10, this user operation is detected by the operation detection unit 11 (step S101).

Next, the processing execution unit 12 checks whether there is processing to be executed by the application after the updating in response to the user operation detected by the operation detection unit 11 (step S102). Here, in a case where the processing to be executed by the application after the updating in response to the user operation detected by the operation detection unit 11 is not identified (Step S102: No), the processing execution unit 12 notifies the processing control unit 21 of operation information indicating the user operation detected by the operation detection unit 11. Then, the processing control unit 21 checks whether there is processing of the application before the updating corresponding to the operation information of which the processing control unit 21 is notified from the processing execution unit 12, that is, processing that would have been executed by the application before the updating in response to the user operation detected by the operation detection unit 11 referring to the operation management DB 22 (step S103).

Here, if there is no processing that would have been executed by the application before the updating in response to the user operation detected by the operation detection unit 11 (step S103: No), the series of operations ends without performing any other operations. On the other hand, if there is processing that would have been executed by the application before the updating in response to the user operation detected by the operation detection unit 11 (step S103: Yes), the processing control unit 21 inquires of the user whether to execute the processing (step S104). Then, if there is a response instructing execution of the processing from the user (step S105: Yes), the processing control unit 21 causes the processing execution unit 12 to execute the processing (step S106). On the other hand, if there is no response instructing execution of the processing from the user (step S105: No), the series of operations ends without performing any other operations.

In addition, if in step S102 described above, processing to be executed by the application after the updating in response to the user operation detected by the operation detection unit 11 is identified (step S102: Yes), the processing execution unit 12 executes the identified processing (step S107). Thereafter, if the execution of the processing is not canceled (step S108: No), the processing by the application after the updating is kept executed, and when the processing ends, the series of operations ends.

On the other hand, if the execution of the processing is canceled (step S108: Yes), the processing execution unit 12 notifies the processing control unit 21 of the operation information indicating the user operation detected by the operation detection unit 11 in step S101 and the processing information that identifies the processing, execution of which has been canceled. The processing control unit 21 checks whether there is processing that would have been executed by the application before the updating in response to the user operation detected by the operation detection unit 11 (step S109) referring to the operation management DB 22 based on the operation information of which the processing control unit 21 is notified from the processing execution unit 12.

Here, if there is no processing that would have been executed by the application before the updating in response to the user operation detected by the operation detection unit 11 (step S109: No), the series of operations ends without performing any other operations. On the other hand, if there is processing that would have been executed by the application before the updating in response to the user operation detected by the operation detection unit 11 (step S109: Yes), the processing control unit 21 then checks whether the processing that would have been executed by the application before the updating is different from processing of the application after the updating that has been canceled based on the processing information of which the processing control unit 21 is notified from the processing execution unit 12 (step S110).

Here, if the processing that would have been executed by the application before the updating in response to the user operation detected by the operation detection unit 11 is the same as the processing of the application after the updating, execution of which has been canceled (step S110: No), the series of operations ends without performing any other operations. On the other hand, if the processing that would have been executed by the application before the updating in response to the user operation detected by the operation detection unit 11 is different from the processing of the application after the updating, execution of which has been canceled (step S110: Yes), the processing proceeds to step S104 described above, and the above-described processing after step S104 is executed.

Note that, in the operation example illustrated in the flowchart of FIG. 9, an inquiry is made to the user whether the processing that would have been executed by the application before the updating in response to the user operation needs to be executed (step S104), and if there is a response instructing execution from the user (step S105: Yes), the processing is executed by the application (processing execution unit 12) after the updating (step S106). However, instead of the processing of steps S104 to S106, an operation method for causing the application after the updating (the processing execution unit 12) to execute the processing that would have been executed by the application before the updating in response to the user operation may be guided. Furthermore, when an inquiry is made to the user in step S104, this operation method may also be guided.

As described above in detail with reference to specific examples, in the information processing system according to the embodiment of the present disclosure, even in a case where the operation method is changed due to updating of an application, a user can acquire a desired result by the performing, on the application after the updating, an operation that is familiar in the application before the updating. Therefore, it is possible to eliminate the inconvenience for users due to the change in the operation method and to greatly improve the convenience. In particular, a visually impaired person or the like may perform an operation familiar in an application before updating on an application after the updating without noticing that the operation method has been changed by the updating of the application, and thus the embodiment of the present disclosure is highly useful.

3. First Modification

In the above-described embodiment, in a case where processing that is to be executed by an application after updating in response to a user operation is identified, on the condition that the execution of the processing is canceled (Undo), processing that would have been executed by an application before the updating in response to the user operation is executed or an operation method for causing the application after the updating to execute the processing that would have been executed by an application before the updating is guided. However, there may be a case where the execution of the processing is continued without being canceled because a user does not notice that the processing to be executed by the application after the updating in response to the user operation is different from the intended desired processing.

Figure 11:
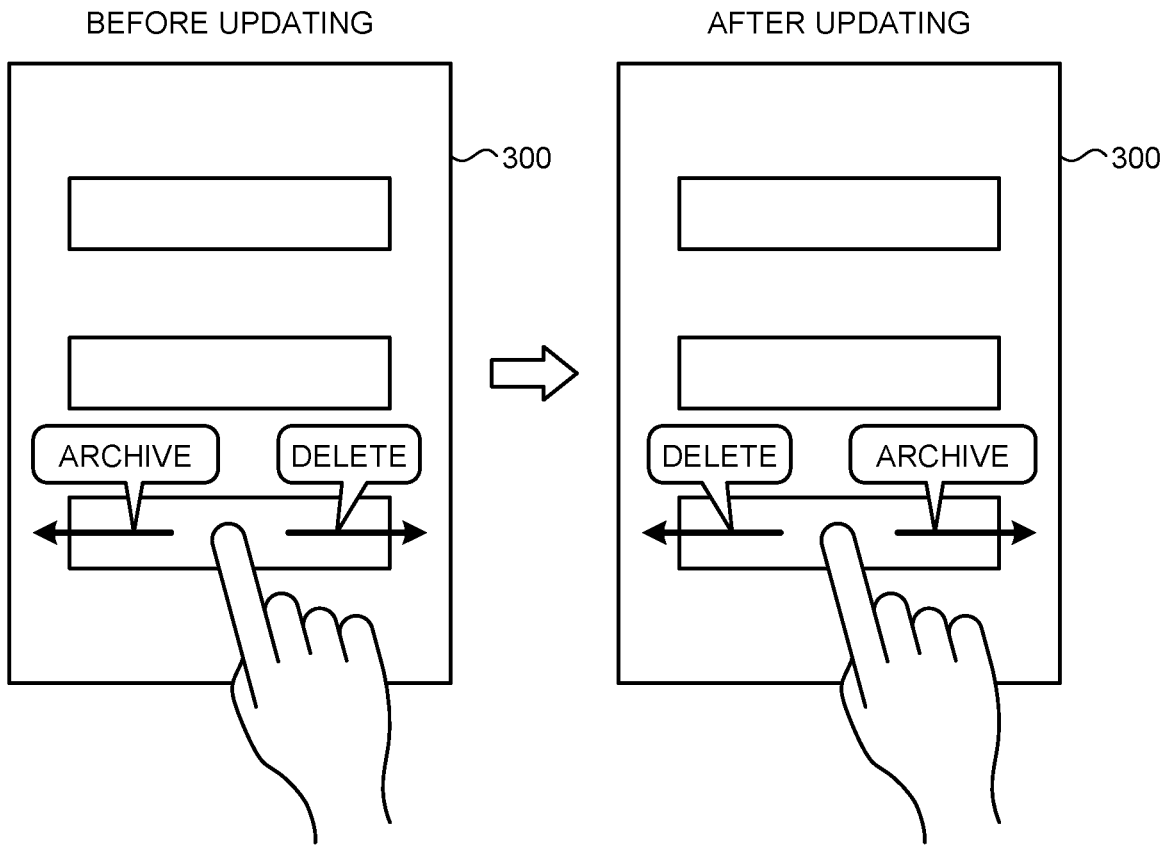
FIG. 11 is a diagram illustrating a first modification.

For example, as illustrated in FIG. 11, it is assumed that the application used by the information device 10 is updated, and the configuration of a GUI 300 itself is not changed, but types of processing corresponding to flick operations on an item of the GUI 300 are changed from left flick: archive and right flick: delete to left flick: delete and right flick: archive. In this case, when a user performs a left flick operation on a certain item for the purpose of archiving the item that is familiar before the updating, processing of deleting the item is executed after confirmation on whether the processing needs to be executed. At this time, there is assumed an inconvenience that the user does not notice that the processing to be executed is delete, the process is executed without being canceled (Undo), and the item to be archived is deleted. In particular, in a case where the user is a visually impaired person or the like, there is a high possibility that such inconvenience occurs.

Therefore, in a case where the processing to be executed by the application after the updating in response to the user operation is identified and the processing is different from the processing that would have been executed by the application before the updating, a warning may be output regardless of whether the execution of the processing is canceled (Undo). That is, in the example illustrated in FIG. 11, the processing to be executed by the application after the updating in response to the left flick operation on a certain item of the GUI 300 is delete, and the processing that would have been executed by the application before the updating is archive, and they are different. Therefore, when the left flick operation is executed, a warning such as a warning sound is output, for example, regardless of whether the execution of the delete processing has been canceled (Undo). As a result, it is possible to alert the user and prevent an inconvenience that unintended processing is executed in advance.

Note that, in a case where the user who has noticed that an unintended processing is to be executed cancels (Undo) the execution of the processing, processing that would have been executed by an application before the updating in response to the user operation may be executed or an operation method for causing the application after the updating to execute the processing that would have been executed by an application before the updating may be guided similarly to the above-described embodiment.

4. Second Modification

In the above-described embodiment, an operation using a touch screen has been described as an example of a user operation on the application, but the operation detection unit 11 may be configured to detect a user operation by another method.

For example, the operation detection unit 11 may detect a user operation by a voice input. In this case, the operation detection unit 11 detects a voice command input from the user as a user operation. In addition, the operation management DB 22 holds table data or the like that associates voice commands and corresponding types of processing for each version of an application. In a case where the processing to be executed by the application after the updating in response to the voice command detected by the operation detection unit 11 is not identified, the processing control unit 21 determines whether there is processing that would have been executed by the application before the updating in response to the voice command referring to the operation management DB 22.

For example, in a case where a correspondence relationship between voice commands having similarity equal to or greater than reference values with respect to a voice command detected by the operation detection unit 11 and type of processing by the application before the updating is recorded in a data table held by the operation management DB 22, the processing control unit 21 identifies processing corresponding to the voice command as processing that would have been executed by the application before the updating in response to the voice command detected by the operation detection unit 11. Then, the processing control unit 21 causes the processing execution unit 12 to execute the processing, or teaches the user a voice command to be input in order to cause the processing execution unit 12 to execute the processing (guides the operation method).

In an application corresponding to the voice command, in a case where a function is added by updating, a voice command having been recognized by the application before the updating may be difficult to be recognized by the application after the updating. On the other hand, in a case where the processing to be executed by the application after the updating in response to the voice command detected by the operation detection unit 11 is not identified, the application after the updating may be caused to execute the processing that would have been executed by the application before the updating in response to the voice command or by the user may be taught a voice command to be input in order to cause the application after the updating to execute the processing, so that convenience can be improved.

Furthermore, the operation detection unit 11 may detect a user operation by a gesture input. In this case, the gesture of the user is input to the information device 10 using a camera or a distance sensor, and is detected by the operation detection unit 11. In addition, the operation management DB 22 holds table data or the like that associates gestures and corresponding types of processing for each version of an application.

In a case where the processing to be executed by the application after the updating in response to the gesture detected by the operation detection unit 11 is not identified, the processing control unit 21 identifies processing that would have been executed by the application before the updating in response to the gesture referring to the operation management DB 22. Then, the processing control unit 21 causes the processing execution unit 12 to execute the processing, or teaches the user a gesture to be input in order to cause the processing execution unit 12 to execute the processing (guides the operation method). Accordingly, convenience can be improved.

5. Third Modification

In the above-described embodiment, the case where the operation method is changed due to the updating of the application has been assumed and described, but the method of the present disclosure is also effective in a case where the operation method is changed by switching the application used so far to another application belonging to the same category. For example, in a case where an application such as housekeeping account-book software or a scheduler that has been used so far is switched to another application, when an operation familiar in the application having been used so far can be used in the application after the switching, convenience is improved.

In the case of the present modification, the operation management DB 22 holds, for each application identified by an application ID, table data in which a correspondence relationship between operation contents and types of processing for the application, or the like is recorded. The applications before and after the switching may be automatically associated with each other based on the category of the applications, or may be automatically associated based on data export/import processing or the like between the applications. In addition, the applications before and after the switching may be associated with each other by accepting an operation of a user specifying the correspondence relationship.

Also in the present modification, in a case where the processing to be executed by the application after the switching in response to the user operation detected by the operation detection unit 11 is not identified, the processing control unit 21 identifies processing that would have been executed by the application before the switching in response to the user operation referring to the operation management DB 22. Then, the processing control unit 21 causes the application after the switching (the processing execution unit 12) to execute the processing or guides an operation method for causing the application after the switching (the processing execution unit 12) to execute the processing. Accordingly, convenience can be improved.

6. Fourth Modification

In addition, the method of the present disclosure is also effective in a case where operation methods are different between applications operated using different information devices. For example, when an application that is often operated on a PC is operated on a smartphone, the operation method on the smartphone may be different from the operation method on the PC even if the application is for implementing the same function. In addition, in an information device equipped with an application such as an AI agent (AI assistant) responding voice commands, a voice command for executing the same processing may be different between information devices. For example, a certain information device for displaying information of a weather forecast may accept a voice command such as "show me the weather", whereas another information device can only accept a voice command such as "show me the weather forecast".

As described above, even in a case where the operation methods are different between applications operated using different information devices, the information devices are registered in advance in association with each other, and an operation familiar in one information device can be used in the other information device, so that convenience is improved.

In the case of the present modification, the operation management DB 22 holds, for each information device identified by a device ID, table data in which a correspondence relationship between operation contents and types of processing for the application operated using the information device, or the like is recorded. In addition, the operation management DB 22 holds a combination of device IDs of associated information devices. Then, among the associated information devices, a correspondence relationship between an application operated by one information device and an application operated by the other information device can be identified using a device ID as a key.

Also in the present modification, in a case where the processing to be executed by the application corresponding to one of the associated information devices in response to the user operation detected by the information device is not identified, the processing control unit 21 identifies processing that would have been executed by the application corresponding to the other information device in response to the user operation referring to the operation management DB 22. Then, the processing control unit 21 causes the application corresponding to the other information device to execute the processing or guides an operation method for causing the application corresponding to the other information device to execute the processing. Accordingly, convenience can be improved.

7. Other Modifications

Note that the operation management DB 22 may be configured to hold information of a plurality of previous versions before the updating for one application, such as information of the last version, information of the second last version, and information of the third last version, and so on, for example. In this case, for example, the fitness for the updating is determined based on, for example, operation tendency of a user for the application, and according to the fitness for the updating, the range of information of the previous versions (the number of the previous versions) held by the operation management DB 22 may be adjusted, such that as the fitness for the updating is lower, information up to an older version is held.

In addition, in a case where the operation management DB 22 holds a plurality of pieces of previous version information before the updating for one application, a plurality of types of processing that would have been executed by the application before the updating in response to a user operation may be identified. That is, the processing that would have been executed by the application before the updating in response to a user operation may be different between, for example, the last version and the second last version. In such a case, the processing control unit 21 may present the plurality of candidates, for example, according to a method illustrated in FIG. 5, and cause the processing execution unit 12 to execute processing corresponding to a candidate selected by the user from among the plurality of candidates.

In addition, the operation management DB 22 may hold configuration information of GUIs such as the GUIs 101 and 102 illustrated in FIG. 3 and the GUIs 201 and 202 illustrated in FIG. 7 for the respective versions. In this case, the processing control unit 21 may cause the information device 10 to display a GUI corresponding to the application before the updating in a case where the processing to be executed by the application after the updating in response to the user operation detected by the operation detection unit 11 is not identified, in a case where the processing to be executed by the application after the updating in response to the user operation is identified but the execution of the processing is canceled, or the like. In addition, a GUI corresponding to the application before the updating and a GUI corresponding to the application after the updating may be sequentially displayed on the information device 10 to cause a user to recognize switching between the GUIs before and after the updating.

Furthermore, in a case where it is estimated that the user is performing an operation that is familiar before the updating on the application after the updating, the processing control unit 21 may perform various controls to help the user to be accustomed to the operations on the application after the updating, for example, by providing a practice menu of the operations on the application after the updating.

Note that, due to updating of the application, a function (processing) that has not been used often before the updating may be eliminated in the application after the updating. In such a case, it is also possible to present to the user which function has been eliminated due to the updating.

Figure 12:
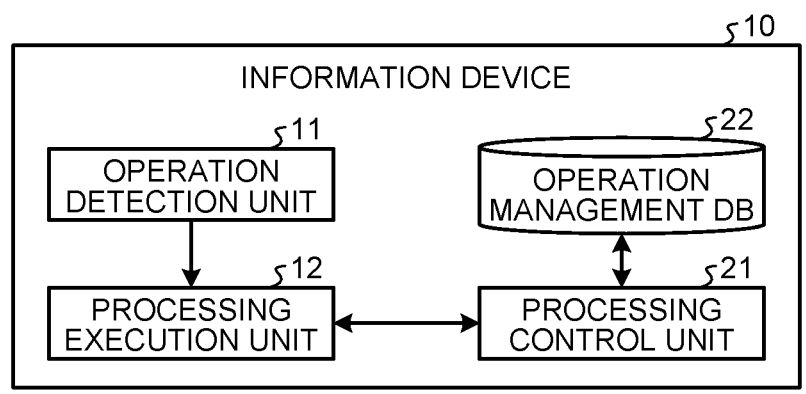
FIG. 12 is a block diagram illustrating a configuration example as a standalone type information processing system.

Note that, in the above-described embodiment, a configuration example has been described as a network type information processing system in which the information device 10 that is in the local environment and is used by a user and the server 20 that is in a cloud environment operate in cooperation. However, the information processing system of the present disclosure may be configured as a standalone type information processing system (information processing device) in which all functional units are implemented only in the information device 10 used by the user, for example, as illustrated in FIG. 12.

In addition, the processing procedure, the specific name, and the information including various types of data and parameters described in the document and illustrated in the drawings can be changed in any ways unless otherwise specified. For example, the various types of information illustrated in each figure are not limited to the illustrated information.

In addition, each component of each device illustrated in the drawings is functionally conceptual, and is not necessarily physically configured as illustrated in the drawings. That is, a specific form of distribution and integration of the devices are not limited to the illustrated form, and all or a part thereof can be functionally or physically distributed or integrated in any unit according to various loads, usage conditions, and the like. For example, the above-described processing control unit 21 and the processing execution unit 12 may be integrated.

In addition, the above-described embodiments and modifications can be appropriately combined within a range that does not contradict processing contents.

Furthermore, the effects described in the present specification are merely examples and are not limited, and other effects may be provided.

8. Hardware Configuration Example

Figure 13:
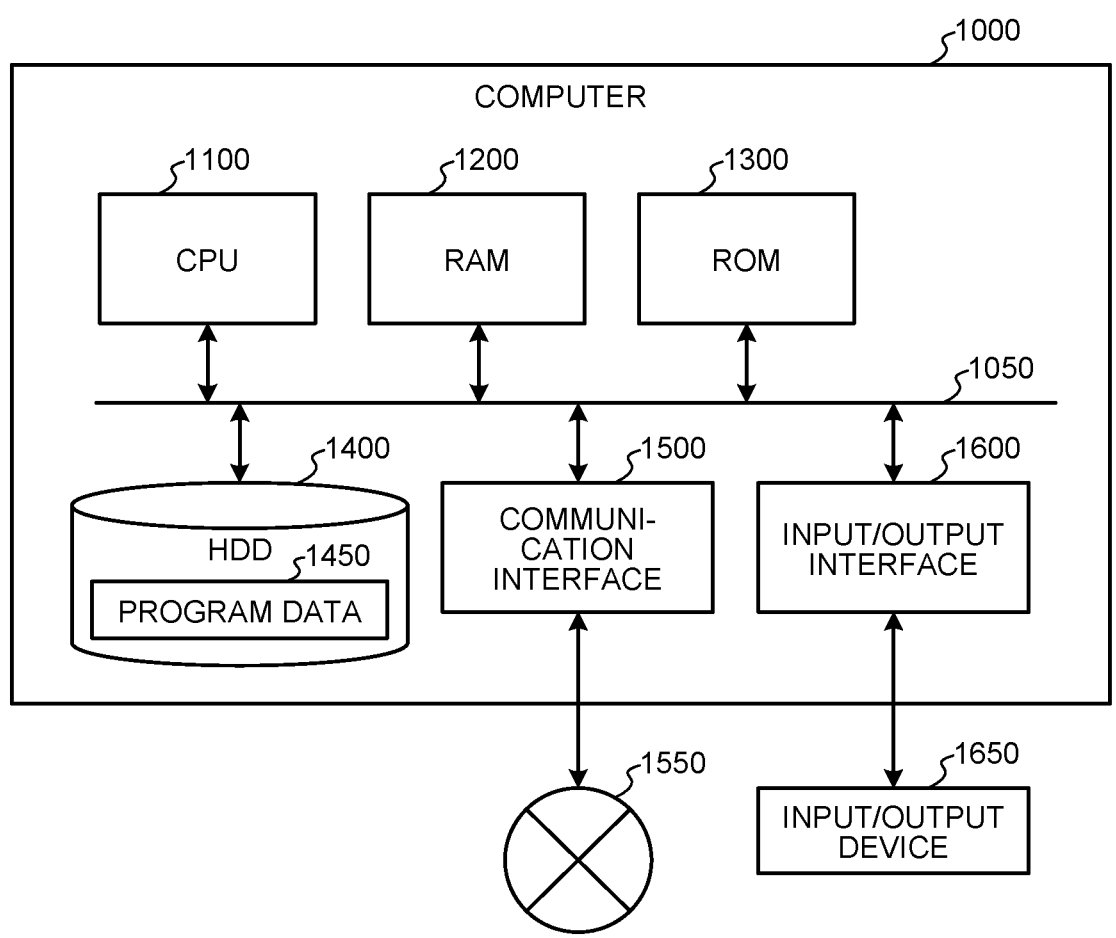
FIG. 13 is a hardware configuration diagram illustrating an example of a computer that implements functions of the information device illustrated in FIG. 12.

The information device 10 and the server 20 in the information processing system according to the above-described embodiment are implemented by using, for example, a computer 1000 having a configuration as illustrated in FIG. 13. Hereinafter, the information device 10 configured as the standalone type information processing system illustrated in FIG. 12 will be described as an example. FIG. 13 is a hardware configuration diagram illustrating an example of the computer 1000 that implements functions of the information device 10 illustrated in FIG. 12. The computer 1000 includes a CPU 1100, a RAM 1200, a read only memory (ROM) 1300, a hard disk drive (HDD) 1400, a communication interface 1500, and an input/output interface 1600. Units of the computer 1000 are connected by a bus 1050.

The CPU 1100 operates based on programs stored in the ROM 1300 or the HDD 1400 to control each unit. For example, the CPU 1100 loads programs stored in the ROM 1300 or the HDD 1400 into the RAM 1200, and executes processing corresponding to various programs.

The ROM 1300 stores a boot program such as a basic input output system (BIOS) executed by the CPU 1100 when the computer 1000 is activated, a program depending on hardware of the computer 1000, and the like.

The HDD 1400 is a recording medium that is readable by the computer 1000 and that stores a program executed by the CPU 1100, data used by the program, and the like in a non-transiently manner. Specifically, as an example of program data 1450, the HDD 1400 stores a program for causing the computer 1000 to implement the functions of the operation detection unit 11, the processing execution unit 12, and the processing control unit 21 of the information processing system according to the present disclosure. In addition, an operation management DB 22 of the information processing system according to the present disclosure is constructed in the HDD 1400.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a touch screen via the input/output interface 1600. In addition, the CPU 1100 transmits data to an output device such as a display or a speaker via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information device 10 illustrated in FIG. 12, the CPU 1100 of the computer 1000 executes a program loaded into the RAM 1200 to implement the functions of the operation detection unit 11, the processing execution unit 12, the processing control unit 21, and the like. In addition, the HDD 1400 stores a program according to the present disclosure and data in the operation management DB 22. Note that the CPU 1100 reads the program data 1450 from the HDD 1400 and executes programs, but as another example, these programs may be acquired from another device via the external network 1550.

9. Supplement

Note that the present technique can also have the following configurations.

(1) An information processing device comprising:
a processing control unit configured to execute predetermined control in accordance with processing that would have been executed by a second application in response to a user operation on a first application in a case where processing to be executed by the first application in response to the user operation is not identified, the second application having a correspondence relationship with the first application.

(2) The information processing device according to (1), wherein
the predetermined control includes causing the first application to execute the processing that would have been executed by the second application in response to the user operation.

(3) The information processing device according to (2), wherein
the processing control unit makes an inquiry to a user whether the processing that would have been executed by the second application in response to the user operation needs to be executed, and causes the first application to execute the processing in a case where execution is instructed by the user.

(4) The information processing device according to (2), wherein
in a case where there is a plurality of candidates as the processing that would have been executed by the second application in response to the user operation, the processing control unit presents the plurality of candidates to a user and causes the first application to execute processing corresponding to a candidate selected by the user.

(5) The information processing device according to any one of (1) to (4), wherein
the predetermined control includes guiding an operation method for causing the first application to execute the processing that would have been executed by the second application in response to the user operation.

(6) The information processing device according to any one of (1) to (5), wherein
even in a case where the processing to be executed by the first application in response to the user operation is identified, in a case where the processing to be executed by the first application in response to the user operation and the processing that would have been executed by the second application in response to the user operation are different and execution of the processing to be executed by the first application is canceled, the processing control unit executes the predetermined control.

(7) The information processing device according to any one of (1) to (5), wherein
even in a case where the processing to be executed by the first application in response to the user operation is identified, in a case where the processing to be executed by the first application in response to the user operation and the processing that would have been executed by the second application in response to the user operation are different, the processing control unit causes a warning to be output.

(8) The information processing device according to any one of (1) to (7), wherein
the processing control unit identifies the processing that would have been executed by the second application in response to the user operation referring to a database in which a correspondence relationship between operation content on the second application and processing is recorded.

(9) The information processing device according to any one of (1) to (8), wherein
the second application is an application before updating to the first application.

(10) The information processing device according to any one of (1) to (8), wherein
the second application is another application belonging to the same category as the first application.

(11) The information processing device according to any one of (1) to (8), wherein
the first application is an application operated by a user using a first information device, and the second application is an application operated by a user using a second information device associated with the first information device.

(12) The information processing device according to any one of (1) to (11), wherein
the user operation includes an operation using a touch screen.

(13) The information processing device according to any one of (1) to (12), wherein
the user operation includes an operation by a voice input.

(14) The information processing device according to any one of (1) to (13), wherein
the user operation includes an operation by a gesture input.

(15) An information processing system including:
an operation detection unit configured to detect a user operation on a first application; and
a processing control unit configured to execute predetermined control in accordance with processing that would have been executed by a second application in response to the user operation in a case where processing to be executed by the first application in response to the user operation is not identified, the second application having a correspondence relationship with the first application.

(16) An information processing method comprising:
a step of executing, by a processing control unit, predetermined control in accordance with processing that would have been executed by a second application in response to a user operation on a first application in a case where processing to be executed by the first application in response to the user operation is not identified, the second application having a correspondence relationship with the first application.

(17) An information processing method including:
a step of detecting, by an operation detection unit, a user operation on a first application; and
a step of executing, by a processing control unit, predetermined control in accordance with processing that would have been executed by a second application in response to the user operation in a case where processing to be executed by the first application in response to the user operation is not identified, the second application having a correspondence relationship with the first application.

(18) A program that causes a computer to implement:
a function of a processing control unit configured to execute predetermined control in accordance with processing that would have been executed by a second application in response to the user operation in a case where processing to be executed by a first application in response to a user operation on the first application is not identified, the second application having a correspondence relationship with the first application.

(19) A program that causes a computer to implement:
a function of an operation detection unit configured to detect a user operation on a first application; and
a function of a processing control unit configured to execute predetermined control in accordance with processing that would have been executed by a second application in response to the user operation in a case where processing to be executed by the first application in response to the user operation is not identified, the second application having a correspondence relationship with the first application.

REFERENCE SIGNS LIST

10 INFORMATION DEVICE
11 OPERATION DETECTION UNIT
12 PROCESSING EXECUTION UNIT
20 SERVER
21 PROCESSING CONTROL UNIT
22 OPERATION MANAGEMENT DB

The invention claimed is:

1. An information processing device, comprising:
a processing control unit configured to:
receive a user operation on a first application;
determine whether a first process, executable by the first application, for the user operation is identifiable;
determine whether execution of the first process is canceled; and
control the first application, to execute a specific control, based on the user operation and a second process executable by a second application, wherein the first application is controlled to execute the specific control in a case where:
the first process executable by the first application is identified,
the execution of the first process is canceled,
the second process executable by the second application is different from the first process executable by the first application, and
the second application has a correspondence relationship with the first application.

2. The information processing device according to claim 1, wherein
the processing control unit is further configured to control, based on the user operation, the first application to execute the second process executable by the second application, and
the second process is executable by the second application based on the user operation.

3. The information processing device according to claim 2, wherein the processing control unit is further configured to:
output an inquiry to inquire execution of the second process executable by the second application for the user operation;
receive, based on the inquiry, an instruction for the execution of the second process; and
control the first application to execute the second process based on the instruction for the execution of the second process.

4. The information processing device according to claim 2, wherein in a case where the user operation corresponds to a plurality of candidate processes, the processing control unit is further configured to:
present the plurality of candidate processes;
receive a selection of a candidate process of the plurality of candidate processes; and
control the first application to execute the second process corresponding to the selected candidate process.

5. The information processing device according to claim 1, wherein the specific control includes a guiding operation for an operation method for execution of the second process by the first application.

6. The information processing device according to claim 1, wherein the processing control unit is further configured to control output of a warning in a case where:
the first process executable by the first application for the user operation is identified, and
the first process executable by the first application for the user operation is different from the second process executable by the second application for the user operation.

7. The information processing device according to claim 1, wherein
the processing control unit is further configured to refer to a database to identify the second process executable by the second application for the user operation, and
the database includes a correspondence relationship between operation content on the second application and a specific process.

8. The information processing device according to claim 1, wherein the first application is an updated version of the second application.

9. The information processing device according to claim 1, wherein
the second application is different form the first application, and
the second application corresponds to a category same as that of the first application.

10. The information processing device according to claim 1, wherein
the first application is operable by a first user of a first information device, and
the second application is operable by a second user of a second information device associated with the first information device.

11. The information processing device according to claim 1, wherein the user operation includes an operation on a touch screen.

12. The information processing device according to claim 1, wherein the user operation includes an operation by a voice input.

13. The information processing device according to claim 1, wherein the user operation includes an operation by a gesture input.

14. An information processing method, comprising:
receiving a user operation on a first application;
determining whether a first process, executable by the first application, for the user operation is identifiable;
determining whether execution of the first process is canceled; and
controlling the first application, to execute a specific control, based on the user operation and a second process executable by a second application, wherein the first application is controlled to execute the specific control in a case where:

the first process executable by the first application is identified, the execution of the first process is canceled, the second process executable by the second application is different from the first process executable by the first application, and the second application has a correspondence relationship with the first application.

15. A non-transitory computer readable medium having stored thereon computer-executable instructions that, when executed by a computer, cause the computer to execute operations, the operations comprising:

receiving a user operation on a first application;

determining whether a first process, executable by the first application, for the user operation is identifiable;

determining whether execution of the first process is canceled; and controlling the first application, to execute a specific control, based on the user operation and a second process executable by a second application, wherein the first application is controlled to execute the specific control in a case where:

the first process executable by the first application is identified, the execution of the first process is canceled, the second process executable by the second application is different from the first process executable by the first application, and the second application has a correspondence relationship with the first application.

* * * * *